United States Patent [19]
Reid

[11] 3,898,161
[45] Aug. 5, 1975

[54] WASTE DISPOSAL SYSTEM

[75] Inventor: James S. Reid, Summit, Ohio

[73] Assignee: The Standard Products Company, Cleveland, Ohio

[22] Filed: Sept. 13, 1973

[21] Appl. No.: 396,839

[52] U.S. Cl................................ 210/152; 210/179
[51] Int. Cl.² .................. B01D 43/00; B01D 15/00
[58] Field of Search .. 210/32, 71, 64, 152, 178–180

[56] References Cited
UNITED STATES PATENTS

| | | |
|---|---|---|
| 2,059,231 | 11/1936 | Hamilton .......................... 210/187 X |
| 2,792,117 | 5/1957 | Laboon............................. 210/187 X |
| 3,306,236 | 2/1967 | Campbell.......................... 210/71 X |
| 3,386,922 | 6/1968 | Schoeffel ......................... 210/32 X |
| 3,568,838 | 3/1971 | Appelgren ........................ 210/179 X |
| R26,891 | 5/1970 | Reid.. ................................ 210/152 |

*Primary Examiner*—John Adee
*Attorney, Agent, or Firm*—Meyer, Tilberry & Body

[57] ABSTRACT

A waste disposal system includes vaporizing means for vaporizing liquid and organic human bacteriological waste material. Ash and other materials are periodically flushed from the vaporizing means by a fresh water flushing arrangement.

3 Claims, 3 Drawing Figures

WASTE DISPOSAL SYSTEM

BACKGROUND OF THE INVENTION

This application pertains to the art of waste disposal, and more particularly to disposal of liquid and organic human bacteriological waste material by vaporization. The improvements of the present invention are particularly applicable to waste disposal systems of the type described in my U.S. Pat. Nos. Re. 26,891 issued May 6, 1970 and 3,699,040 issued Oct. 17, 1972, the disclosures of which are hereby incorporated herein by reference.

As described in the aforementioned patents a waste disposal system includes a vaporizing means which is heated by electricity; by a fluid fuel burner; or by exhaust gasses from a fuel burning engine. In waste disposal systems of the type described, the vaporizing means comprises a boiler which is heated. Liquid and organic human bacteriological waste material is metered into the heated boiler for vaporization and sterilization. The interior walls of the boiler become caked with ash and mineral residue which greatly reduces the efficiency of heast transfer. Such deposits must be cleaned from the vaporizing means at periodic intervals in order to maintain optimum efficiency of the system.

It would be desirable to have an arrangement for cleaning such deposits from vaporizing means of the type described without requiring disassembly of the entire apparatus.

SUMMARY OF THE INVENTION

A waste disposal system of the type described includes an arrangement for shutting off waste masterial to the vaporizing means and starting flow of fresh water to sweep deposits from the vaporizing means. In effect, the vaporizing means is flushed with fresh water at periodic intervals to maintain optimum heat transfer.

The flushing system of the present invention may be used with a static boiler of the type described in the aforementioned U.S. Pat. No. Re. 26,891 or with a centrifugal vaporizer as described in aforementioned U.S. Pat. No. 3,699,040.

In accordance with one arrangement, the vaporizing means is provided with first feed means for feeding waste material thereto, and with first outlet means for exhausting vapor therefrom. Second feed means is provided for feeding fresh flush water to the vaporizing means, and second outlet means is provided for exhausting the fresh water therefrom.

Introduction of fresh water into the vaporizing means causes the fresh water to flash into steam for helping break deposits from the internal walls of the vaporizing means. The caked deposits are then swept from the boiler when the fresh water exhaust line is open.

In a preferred arrangement, the vaporizing means has its entire internal peripheral surface coated with a non-stick material, such as polytetrafluorethylene.

In accordance with another aspect of the invention, particularly where the vaporizing means is of the centrifugal type, holding tray means in positioned within the vaporizing means for receiving liquid introduced through a liquid inlet. The holding tray means includes an overflow edge for introducing liquid from the holding tray means into the vaporizing means. This provides uniform distribution of the liquid into the vaporizing means. In addition, a basket containing an adsorbent may be positioned on the holding tray means so that liquid introduced into the vaporizing means flows through the adsorbent before introduction into the vaporizing means over the overflow edge of the holding tray means.

It is a principal object of the present invention to provide an improved arrangement for flushing deposits from a vaporizing means in a waste disposal system.

It is an additional object of the present invention to provide an improved arrangement for maintaining optimum heat transfer in a waste disposal system.

It is a further object of the present invention to provide an improved arrangement for introducing waste material into a centrifugal vaporizer.

It is another object of the present invention to provide an improved arrangement for filtering liquid through an adsorbent before it is introduced into the vaporizing means of a waste disposal system.

BRIEF DESCRIPTION OF THE DRAWING

FIG. 2 is another somewhat diagrammatic illustration of another waste disposal system having the improvements of the present invention incorporated therein; and, FIG. 3 is a diagrammatic illustration of a control circuit for use with automatic valves or the like.

DESCRIPTION OF A PREFERRED EMBODIMENT

Figure 1:
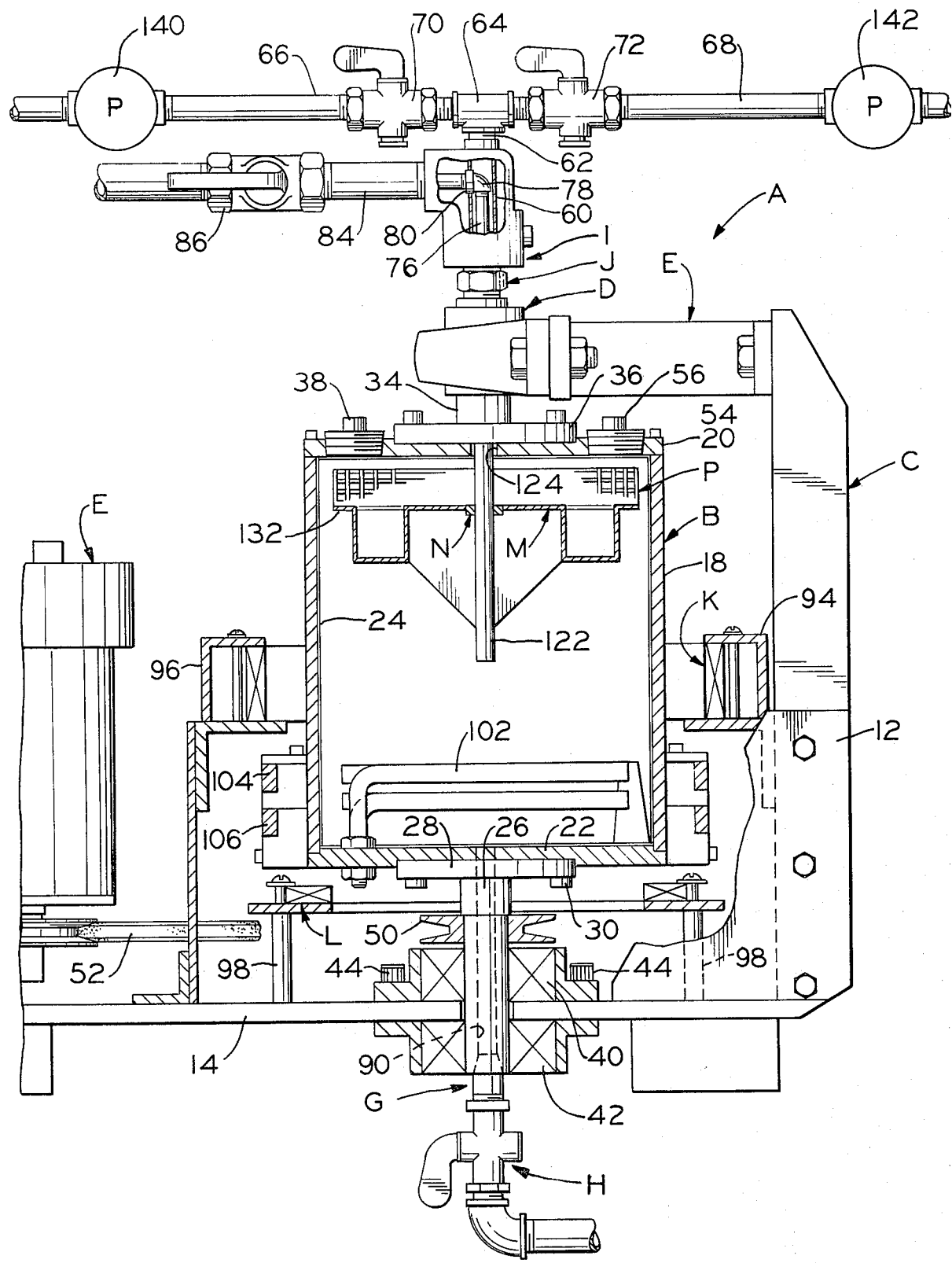
FIG. 1 is as cross-sectional elevational view showing a waste disposal system having the improvements of the present invention incorported therein.

Referring now to the drawing, wherein the showings are for purposes of illustrating a preferred embodiment of the invention only and not for purposes of limiting same, FIG. 1 shows a waste disposal system A for use in vaporizing liquid and organic human bacteriological waste material. It should be recognized that the improved vaporizing means of the present invention may be used in homes or other permanent residences; on boats, airplanes; or on land vehicles. Thus, the improvements of the present invention are capable of use in fixed installations for human habitation or on any type of human conveyance.

In accordance with one arrangement, the waste disposal system shown in FIG. 1 includes a substantially cylindrical vaporizing means or boiler B. Frame or support means C is provided for mounting vaporizing means B. Frame means C includes a substantially vertical portion 12 and a horizontal portion 14.

In one arrangement, vaporizing means B includes a cylindrical peripheral wall 18 having top and bottom walls 20 and 22 secured thereto for forming a substantially sealed container. The interior surfaces of cylindrical peripheral wall 18, and top and bottom walls 20 and 22, are preferably coated with a non-stick material generally indicated by numeral 24. Non-stick material 24 may comprise polytetrafluoroethylene or the like bonded to the interior surfaces.

In one arrangement, vaporizing means B is positioned with its longitudinal axis extending vertically. A generally cylincrical shaft 26 has a flange portion 28 secured to bottom wall 22 as by bolts 30. An upper cylindrical shaft 34 includes a flange portion 36 secured to top wall 20 as by bolts 38. Shafts 26 and 34 are substantially coincidental with one another and with the vertical longitudinal axis of vaporizing means B. Bottom shaft 26 is rotatably mounted in top and bottom cartridge bearing assemblies 40 and 42 secured to opposite sides of horizontal support portion 14 as by bolts 44. Upper shaft 34 is rotatably mounted in bearing assembly D secured to the top of vertical portion 12 of support C as by bracket E.

A V-belt pulley 50 is keyed on bottom shaft 26, and is drivingly connected through a belt 52 with electric motor F mounted on horizontal support portion 14. The lower portion of bottom shaft 26 is connected through bearing 42 with a flushing conduit G having a valve H therein.

Top wall 20 may be removably secured to the upper edge portion of cylindrical peripheral wall 18 as by bolts 54. Top wall 20 may have a plurality of plugs as at 56 threaded through holes therein for inspection of the interior of vaporizing means B.

Upper shaft 34 is hollow and is connected with a rotary joint I as by coupling J. Shaft 34 connects with conduit 60 in rotary joint coupling I. Conduit 60 of rotary joint coupling I is connected at its opposite end with a conduit 62 connected with a tee 64. Waste conduit 66 and fresh water conduit 68 communicate with the opposite ends of tee 64 through valves 70 and 72. A smaller diameter conduit 76 is connected with elbow portion 78 within rotary joint conduit 60. Elbow 78 is secured as at 80 to rotary joint conduit 60 and to exhaust conduit 84 having a valve 86 therein.

Lower shaft 26 has a centrally located bore 90 therethrough communicating with clean-out conduit G. Vaporizing means B may be heated in any suitable manner. For example, container B may be heated by electrical heaters; by fuel burning burners; or by exhaust gases from a fuel burning engine. In the arrangement shown, a cylindrical electrical band heater is supported by brackets 94 and 96 on support C around cylindrical peripheral wall portion 18 for heating peripheral wall portion 18. An electrical heater L is positioned on supports 98 beneath bottom wall 22 of vaporizing means B. An electrical Calrod 102 is positioned within vaporizing means B. Suitable slip rings as at 104 and 106 are mounted on peripheral wall 18 of vaporizing means B, and are connected with Calrod 102 for supplying electrical energy thereto. Calrod 102 may also be replaced by an electrical heater encased within an aluminum heating plate or the like located within the bottom of vaporizing means B. An electrical Calrod may also extend through the walls of peripheral wall 18 as described in my aforementioned U.S. Pat. No. 3,699,040. Various types of heating means described in my aforementioned patents may also be used.

In a preferred arrangement, lower end portion 122 of exhaust conduit 76 extends substantially downward into vaporizing means B through top wall 20 thereof. Top wall 20 has an enlarged circular opening 124 therein through which conduit 76 centrally extends. Stationary conduit 76 has a circular plate member M attached thereto as by compression fitting N. Circular plate member M includes an outer peripheral portion 130 having a generally U-shaped cross-sectional configuration. Plate member M further includes a circular outer peripheral edge 132 spaced inwardly from the inner peripheral surface of cylindrical wall portion 18. A metal mesh basket P filled with adsorbent, such as activated charcoal, rests upon the upper surface of plate member M.

Plate member M provides an arrangement for straining all liquid introduced into vaporizing means B through the adsorbent in basket P, and for uniformly distributing the liquid over outer peripheral edge of 132 into vertically positioned vaporizing means B. In addition, organic solids may be trapped within U-shaped portion 130, while liquid having relatively minute organic solids flows over peripheral edge 132 into vaporizing means B.

Waste material supply conduit 66 is connected with a suitable pump 140 connected through a conduit with a waste tank from toilet and washing facilities. Clean water inlet 68 is connected through a suitable pump 142 which in turn is connected with a source of fresh water supply.

In the system described, various arrangements may be provided for first energizing vaporizing means B. For example, a suitable control may be energized for energizing the electrical heating elements for bringing vaporizing means B up to a proper operating temperature. Other sensing means may be provided for operating a fuel burner, or for using exhaust gases from a fuel burning engine to bring operating means B up to a proper operating temperature. Once vaporizing means B is up to a proper operating temperature, motor F may be energized to rotate vaporizing means B at a high angular velocity. It will be recognized that motor F and the heating means may be energized simultaneously if so desired. Once vaporizing means B is up to a proper operating temperature, valve 70 in waste material inlet line 66 may be opened, while valve 86 in exhaust line 84 is opened. It will also be recognized that valves 70 and 86 may be opened simultaneously with energization of motor F and the heating means. Once vaporization means B is up to a proper operating temperature, metering pump 140 is energized for metering liquid and organic human bacteriological waste material into vaporizing means B. Such waste material flows through conduit 60 in rotary joint I, and through opening 124 in top wall 20 of vaporizing means B. Waste pump 140 may be of the peristaltic type including a flexible conduit successively squeezed by a plurality of rollers for pumping waste material from the waste tank. Such waste material flows through opening 124 in top wall 20 of vaporizing means B onto plate member M. The waste material then flows into U-shaped portion 130 where organic solids and the like may be collected. The waste material liquid then flows over peripheral edge 132 into vaporizing means B which is at an extremely high temperature. The high angular velocity of vaporizing means B, which is being driven by motor F, forces organic solids and the like to the outer periphery of vaporizing means B. Thus, substantially pure liquid is boiled and vaporized within vaporizing means B. Vapor escapes through end portion 122 of conduit 76, and through rotary joint I to exhaust line 84. Naturally, exhaust line valve 86 is open. Exhaust line 84 may lead through valve 86 to the exhaust or tail pipe of a fuel driven engine. However, exhaust line 84 may also lead to atmosphere or, to a settling pit or drainage field. Waste material overflowing plate M passes through the adsorbent positioned within basket P for removing odors therefrom.

The described valves and pumps may be manually or electrically operated. After a predetermined period of operation of the waste disposal system, valve 70 may be closed and pump 140 de-energized to stop flow of waste material into vaporizing means B. Valve 86 may also then be closed. Valve 72 of fresh water inlet conduit 68 may then be opened simultaneously with fresh water outlet valve H. Fresh water pump 141 may then be energized for supplying fresh water into vaporizing means B through conduit 60 in rotary joint I, and through opening 124 in top wall 20 of vaporizing means B. Such fresh water may be supplied at a greater rate than the supply of waste material so that solids collected within U-shaped portion 130 will be swept clean into vaporizing means B. The fresh water supplied also purifies and reactivates the adsorbent within basket P. The fresh water will flush away caked deposits from the interior surface of vaporizing means B. Clean-out valve H may be opened simultaneously with fresh water inlet valve 72 and energization of pump 142, or slightly thereafter. Opening of flushout valve H opens outlet conduit 98 in bottom wall 22 to flow of liquid therethrough. Liquid flowing at a rapid rate through outlet conduit 98 rapidly flushes residue from vaporizing means B. The flushed residue may flow through outlet conduit G into the exhaust system of a fuel burning engine or to a disposal field for fixed residences. Such residue will be purified, and contain substantially no live bacteria, due to the high heat of calcination and purification within vaporizing means B.

Figure 2:
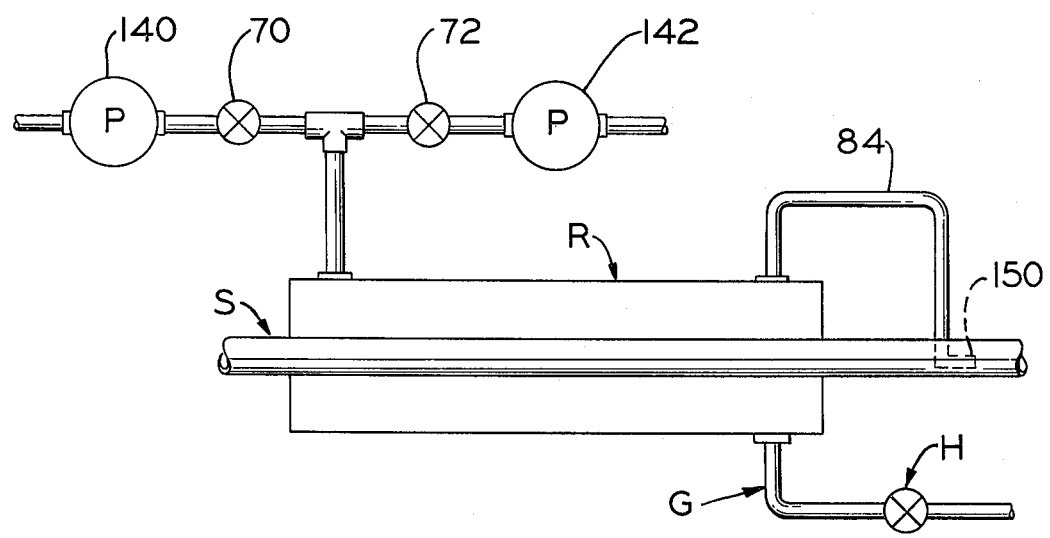

FIG. 2 shows an arrangement wherein vaporizing means or boiler R is constructed around exhaust conduit S from a fuel burning engine. The waste disposal system may be initially energized by throwing a switch to place a thermocouple in the circuit to insure that a boiler R is at a proper operating temperature. Valve 70 may then be opened while pump 140 is energized for metering waste material into boiler R. The waste material can be vaporized by heat from any suitable source. The waste material is exhausted through exhaust vapor conduit 84 back into exhaust conduit S downstream of boiler R. When it is desired to flush boiler R of the deposits, valve 70 and pump 140 are de-energized while fresh water inlet valve 72 and fresh water pump 142 are energized. The fresh water supplied to reservoir R may then flow out flushing conduit G when flushing valve H is open. Flushing valve H may lead back into conduit S, or to a waste disposal field or the like. Vapor exhaust valve 86, which may normally lead back into conduit S downstream of boiler R through conduit 84 and venturi 150, may or may not include a valve as described with respect to valve 86 in FIG. 1.

In many instances, it will be recognixzed that valves 70 and 72 may simply be ball check valves allowing flow of waste material or fresh water therethrough in one direction. Exhaust ventconduit 84 may or may not include a valve because only vapor escapes therethrough.

Many different control arrangements, including manual control arrangements, may be used with waste disposal systems of the present invention. Inlet valves 70 and 72 may be one-way ball check valves permitting flow from pumps 140 and 140 to boiler R in only one direction. Valves 70 and 72 may also be manually operated. Likewise, valve H for exhausting fresh water used in flushing may be electrically or manually operated between its open and closed positions. A valve as at 86 in FIG. 1 may or may not be provided in vapor vent conduit 84 from vaporizing means R. Pumps 140 and 142 may be individually controlled or automatically. Obviously, a main on-off switch in provided for energizing electrical heaters when they are used, or fuel burning heaters. The use of exhaust gases from a fuel burning engine requires no energization of a heating means. Motor F for rotating the centrifugal vaporizer of FIG. 1 also will normally have a control switch. In operation of the device, a simple temperature sensor may be positioned within the vaporizing means. In the embodiment of FIG. 1, such a temperature sensor may be positioned externally of vaporizing means B or attached to inner end portion 122 of conduit 76 within vaporizing means B. Control wires on such a temperature sensing device would extend through opening 124 and through the conduits to a control switch or temperature indicator. When the vaporizing means is at a desired temperature, waste material pump 140 may be energized. Where valve 70 is manual, it would already be opened. Where valve 70 is a one-way ball check valve, no energization is necessary. Where valve 70 is solenoid operated, it could be energized prior to, or simultaneously with, energization of pump 140. Waste material will then be pumped from the waste tank to vaporizing means B or R for vaporization. In the embodiment of FIG. 1, such waste material flows into plate M and into U-shaped portion 130 for uniform distribution over peripheral edge 132. Such waste material is filtered through the adsorbent position in mesh basket P. It will be recognized that such an adsorbent basket may also be positioned in vaporizing means R of FIG. 2. Vaporization of the waste material in reservoir B causes the vapor to escape through conduits 76 and 84. In the embodiment of FIG. 2, the vapor simply escapes through exhaust vapor conduit 84. Such conduit may or may not include a valve 86. If a valve is provided, naturally it will be open during operation of the system for vaporizing waste. After a predetermined period of operation, ash and inorganic deposits form within the vaporizing means. Therefore, waste pump 140 may be de-energized while the heating means remains energized for heating the vaporizing means to a very high temperature. All of the inorganic solids are then calcined to ash. Valve 72 and fresh water pump 142 may then be energized for rapidly feeding fresh water to the vaporizing means. Such fresh water will instantaneously flash into steam for aiding in breaking the ash and caked deposits from the internal walls of the vaporizing means. Either simultaneously with energization of fresh water pump 142, or somewhat thereafter, flush water outlet valve H is opened so that the deposits within the vaporizing means may be flushed therefrom with a rapid flow of fresh water through fresh water outlet conduit G. Such fresh water, along with the deposits it carries, may be swept into the exhaust of an internal combustion engine for discharge into a body of water, or may be swept into another disposal field when the system is used in fixed installations. Fresh water pump 142 may supply fresh water at a substantially greater rate than metering waste material pump 140. Fresh water pump 142 may operate on a timer for pumping fresh water to the vaporizing means for a predetermined period of time which is less than that required to completely fill the vaporizing means. Therefore, flush valve H may be opened as soon as fresh water pump 142 is energized. However, a level sensing device may be positioned within the vaporizing means in series with fresh water pump 142. When the level sensor senses a substantially full condition, it would de-energize fresh water pump 142 and open flush valve H. Many different control arrangements, include manual control arrangements for the valves, or switches for the valves, may be devised. In addition, a single pump having two inlets, one connected to the waste material storage tank and another connected to a source of fresh water, may be provided if so desired. The pump may also be of the peristaltic type including a pair of tubes progressively squeezed by rollers on a rotor. One of the tubes may be connected with the waste material storage tank, while the other is connected with a source of other water. The pump may operate at all times while the described valves may be manually or solenoid operated for introduction of either waste material or fresh water into the vaporizing means.

Figure 3:
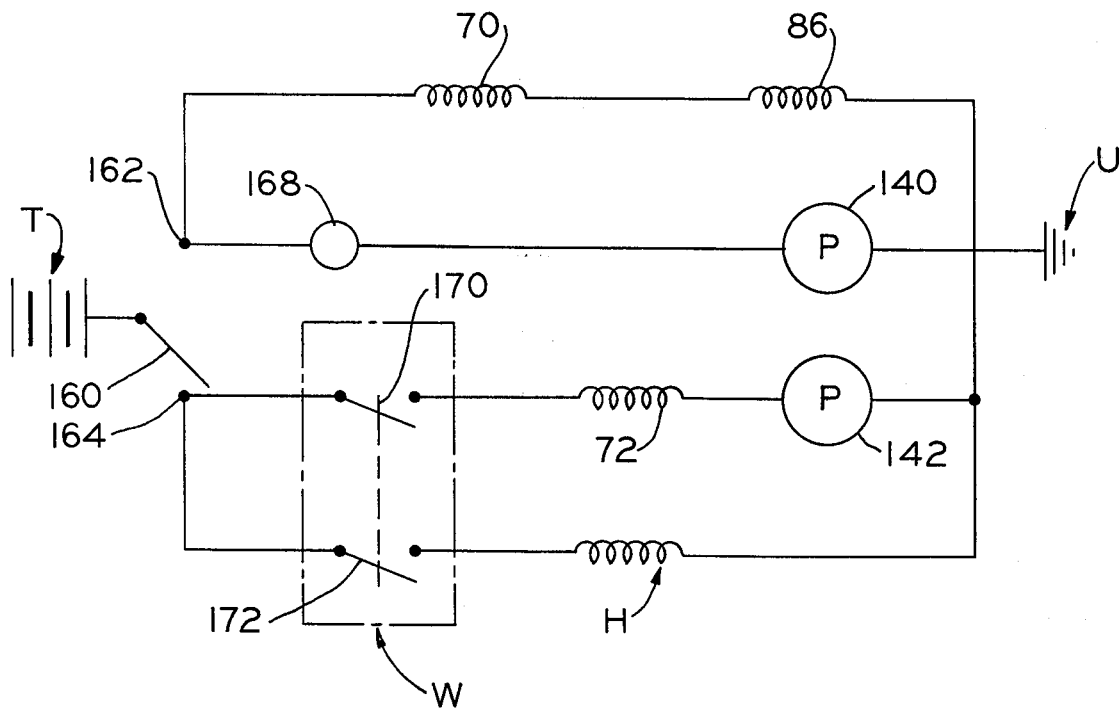

One rather diagrammatic illustration of a control arrangement is shown in FIG. 3. The control circuit may be connected between a battery T and ground U. A manually operated switch 160 has an off position shown, and can be thrown to contact either of contacts 162 or 164. When switch 160 is closed with contact 162, a circuit is completed through a temperature sensing device 168 and pump 140. Temperature sensing device 168 is normally open and will be closed when the vaporizing means reaches a porper operating temperature. Simultaneously with closing of switch 160 and contact 162, waste material inlet valve 70 and vapor outlet valve 86 may be opened, when such valves are solenoid operated. When temperature sensing device 168 senses a proper operating temperature for the vaporizing means, metering waste material pump 140 will be energized for metering waste material into the vaporizing means. As long as efficient heat is supplied, the waste material will simply be vaporized. If too much waste material is supplied, or the heating means is not supplying sufficient heat, temperature control device 168 will open for stopping pump 140 until the temperature again reaches a desired point. After any desired period of time, when it is desired to flush deposits from the vaporizing means, switch 160 may be closed with contact 164. This will de-energize pump 140, and close valves 70 and 86. Simultaneously, solenoid valve 72 will be opened through normally closed switch 170 of level sensing switching device W. Pump 142 will also be energized for rapidly supplying fresh water into the vaporizing means. In the embodiment of FIG. 1, the fresh water will enter vaporizing means B through opening 124 in top wall 20. Such fresh water will purge the adsorbent in basket P and sweep organic particles from U-shaped portion 130 of plate member M. Such fresh water will also instantly flash into steam as it overflows plate edge 132 into vaporizing means B. This will further aid in breaking ash and other residue from the walls of vaporizing means B. Flush water valve H could have been opened simultaneously with opening of fresh water inlet valve 72 and fresh water pump 142, if so desired. In such an arrangement, fresh water pump 142 would supply fresh water to vaporizing means B at a rate greater than that at which the liquid could flow out of flush conduit G. In the arrangement shown in FIG. 3, fresh water could continue being supplied to vaporizing means B until level sensing device W, which could be positioned on inner end portion 122 of conduit 76, senses that there is a lot of fresh liquid within vaporizing means B. Level sensing device W will then operate for opening switch 170 and closing switch 172 which would then energize flush water valve H to its open position for discharging flush water and entrained residue through flush conduit G.

In the arrangement described, perforate basket P may be generally cylindrical, and have a shape like that of an air filter for the air inlet to a carbuetor on an automobile. Therefore, material flowing into vaporizing means B first strikes plate M and flows into U-shaped portion 130. Such liquid material does not pass through the adsorbent in basket P until flowing out of U-shaped portion 130 toward outer peripheral edge 132 of plate M.

Although the invention has been shown and described with respect to certain preferred embodiments, it is obvious the equivalent alterations and modifications will occur to others skilled in the art on the reading and understanding of this specification. The present invention includes all such equivalent alterations and modifications, and is limited only by the scope of the claims.

Having thus described my invention, what is claimed is:

1. An apparatus for disposing of liquid and organic waste material comprising: a substantially cylindrical vaporizing chamber having its longitudinal axis extending vertically; substantially circular top and bottom covers attached to said vaporizing chamber; tubular flush outlet means attached to said bottom cover and extending therethrough along the longitudinal axis of said vaporizing chamber; tubular inlet means attached to said top cover and extending therethrough along the longitudinal axis of said vaporizing chamber; tubular vapor outlet means within said tubular inlet means said tubular vapor outlet means having an outside diameter substantially smaller than the inside diameter of said tubular inlet means, said tubular vapor outlet means extending into said vaporizing chamber further than said tubular inlet means extends into said vaporizing chamber; a circular plate member within said vaporizing chamber attached to the outside surface of said tubular vapor outlet means, said vapor outlet means passing through the center of said circular plate, said circular plate member including an outer peripheral portion having a generally U-shaped configuration; a circular metal mesh basket attached to said circular plate member; support means connected to the downwardly extending portion of said tubular flush outlet means and the upwardly extending portion of said tubular inlet means to permit rotation of the entire apparatus about its longitudinal axis; drive means connected along said longitudinal axis for rotating said apparatus; heating means outside the cylindrical walls of said vaporizing chamber for heating said vaporizing chamber; valve means on said tubular flush outlet means and valve means on said tubular vapor outlet means and means for selectively operating said valve means; and valve means on said tubular inlet means for selectively introducing either waste material or fresh flush water into said vaporizing chamber.

2. The waste disposal apparatus as described in claim 1 wherein the inside surfaces of said vaporizing chamber are coated with a material having a lower adhesion potential than the original surface of said chamber.

3. The waste disposal apparatus as described in claim 2 wherein the coating material is polytetrafluoroethylene.

* * * * *